(12) United States Patent
Kojima et al.

(10) Patent No.: US 8,942,517 B2
(45) Date of Patent: Jan. 27, 2015

(54) MULTI-MODE INTERFERENCE MANIPULATOR

(75) Inventors: Keisuke Kojima, Weston, MA (US); Bingnan Wang, Boston, MA (US); Toshiaki Koike-Akino, Medford, MA (US); Wangqing Yuan, South Bend, IN (US); Satoshi Nishikawa, Tokyo (JP)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 373 days.

(21) Appl. No.: 13/445,885

(22) Filed: Apr. 12, 2012

(65) Prior Publication Data
US 2013/0272644 A1    Oct. 17, 2013

(51) Int. Cl.
*G02F 1/225*    (2006.01)

(52) U.S. Cl.
USPC .......................................................... 385/3

(58) Field of Classification Search
None
See application file for complete search history.

(56) References Cited

U.S. PATENT DOCUMENTS

| 4,781,424 A | 11/1988 | Kawachi et al. | |
| 2011/0064422 A1* | 3/2011 | Kim et al. | 398/214 |

OTHER PUBLICATIONS

Biermann et al. "Enhanced Optical Polarization Anisotrophy in Quantum Wells Under Anisotropic Tensile Strain," Quantum Electronics Letters; IEEE Journal of Quantum Electronics, vol. 39; No. 3; Mar. 2003; pp. 401-403.

L. B. Soldano et al.; "Mach-Zehnder Interferometer Polarization Splitter in InGaAsP/InP;" IEEE Photonics Technology Letters, vol. 6.; No. 3, Mar. 1994; pp. 402-405.

* cited by examiner

*Primary Examiner* — Jerry Rahll
(74) *Attorney, Agent, or Firm* — Dirk Brinkman; Gene Vinokur

(57) ABSTRACT

A multi-mode interference includes a core portion suitable, at any point, for propagating an optical signal having multiple spatial modes. The core portion includes a shifting section for shifting phases of the spatial modes of the optical signal.

19 Claims, 5 Drawing Sheets

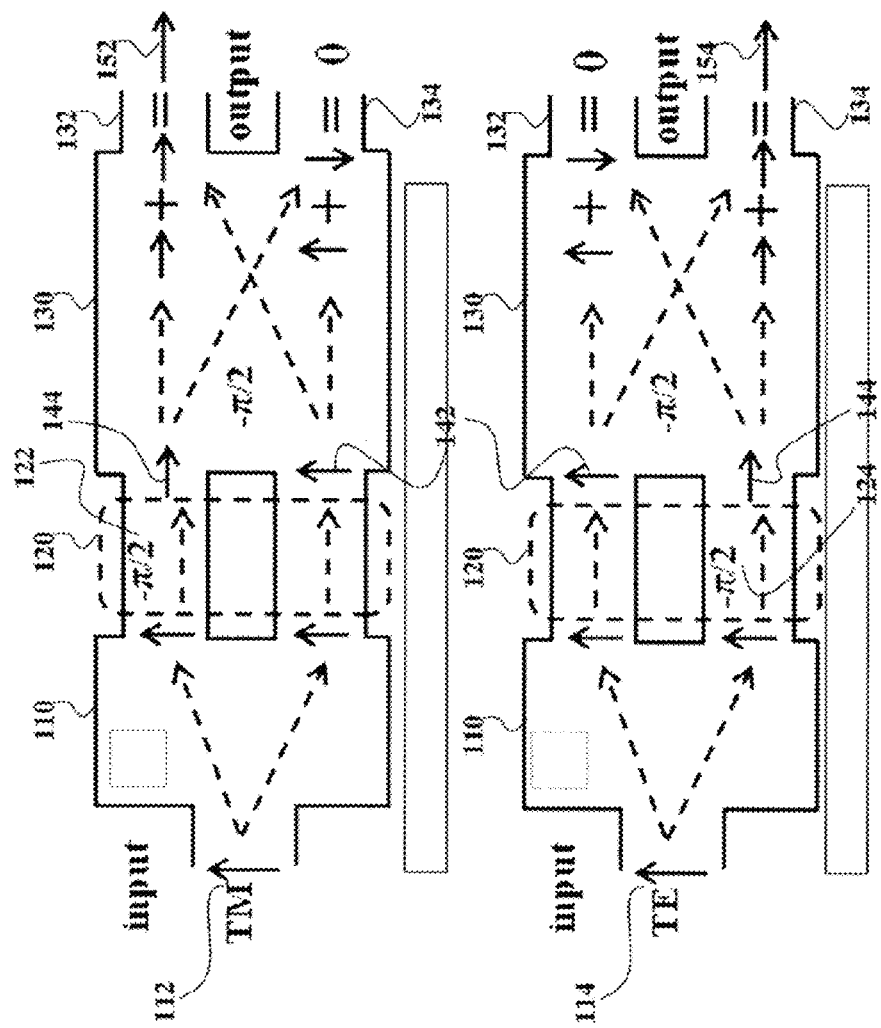

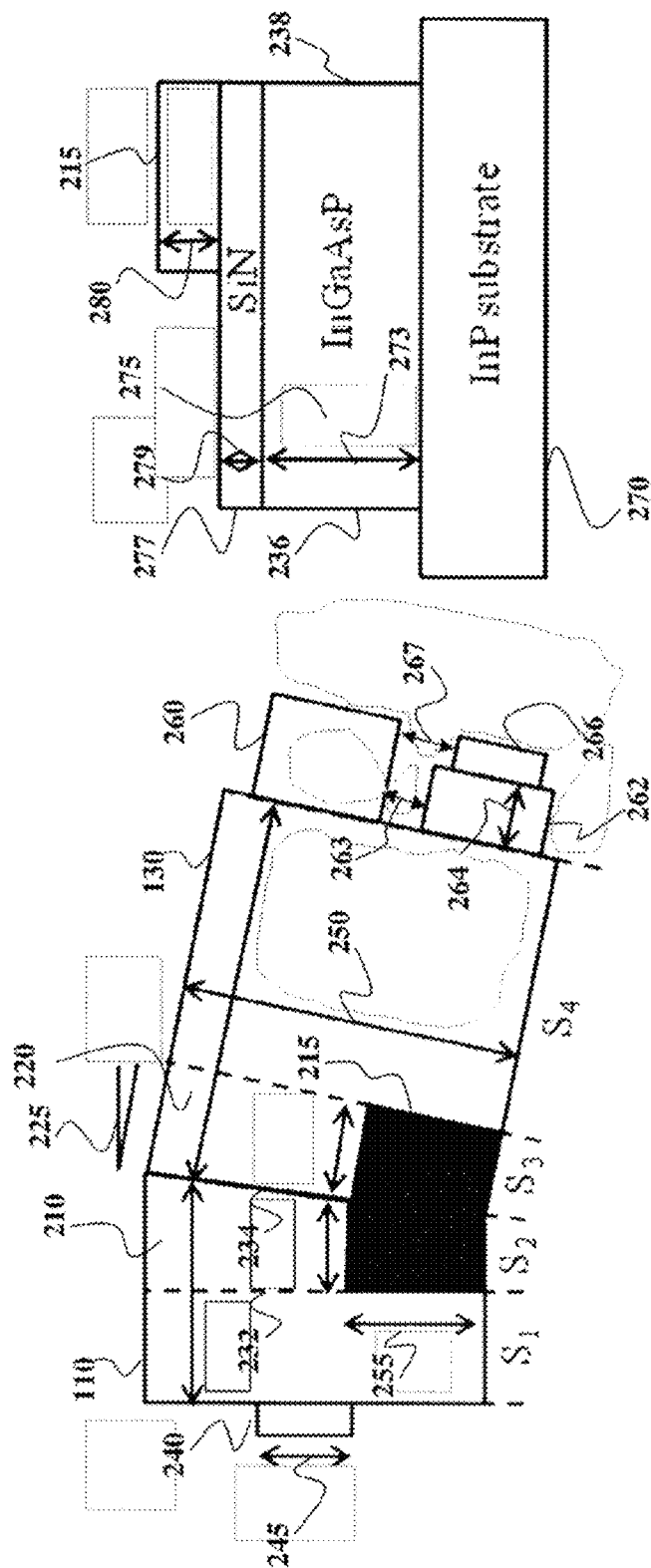

MULTI-MODE INTERFERENCE MANIPULATOR

FIELD OF THE INVENTION

This invention relates generally to optical manipulators, and more particularly to multi-mode interference (MMI) devices for propagating and manipulating an optical signal.

BACKGROUND OF THE INVENTION

Controlling a polarization mode and a spatial mode of optical signals in photonic integrated circuits (PICs) is important for optical communication networks. For example, a conventional single mode fiber does not preserve the polarization mode. When the optical signal is coupled from the single mode fiber to the PICs, the signal decomposes into arbitrary compositions of two orthogonal polarization components, namely, a first component in a transverse electric (TE) mode and a second component in a transverse magnetic (TM) mode. In many modules used in the PICs, the components in the TE and TM modes have different characteristics. For example, the components having different TE and TM modes propagate at different velocities in a high index contrast waveguide, and the energy coupling coefficients of a microring resonator for the TE and TM modes are different.

These polarization-dependent effects reduce the performances of the PICs, especially for high speed communication. Also, most optical communication networks use only one polarization mode. Furthermore, if the components in both polarization modes are used in polarization-division multiplexing (PDM) systems, then the spectral efficiency of such systems can be increased.

Typically, systems for controlling polarization of optical signals, e.g., polarization transparent systems and polarization multiplexing systems, use various polarization manipulators, such as polarization converters and/or polarization splitters. For example, polarization splitters can be utilized in polarization transparent systems to solve, e.g., polarization dependence and polarization mode dispersion problems in the current photonic integrated circuits (PICs). Also, the polarization splitters can be utilized in polarization-division multiplexing (PDM) systems to increase the spectral efficiency.

Accordingly, there is a need to design a polarization manipulator that is compact, has a large bandwidth, and simple in fabrication.

SUMMARY OF THE INVENTION

It is an object of some embodiments of an invention to provide a polarization manipulator having a large bandwidth. It is further object of some embodiments of the invention to provide a polarization manipulator that is simple to fabricate. For example, it is an object of one embodiment to provide such polarization manipulator that includes a single integrated device, such that the fabrication is simplified.

It is further object of some embodiments of the invention to provide a compact polarization manipulator. For example, it is an object of one embodiment to provide such polarization manipulator that has length reduced as compared to other manipulators.

Various embodiments of the invention are based on the realization that a multimode interference (MMI) device can be advantageously used as a polarization manipulator due to the compactness, large bandwidth, and high fabrication tolerance. For example, it is realized that MMI-based polarization devices constructed on III-V substrates, such as indium phosphide (InP) and gallium arsenide (GaAs) can integrate active PIC components, such as laser and semiconductor optical amplifier (SOA), with other passive components. However, as a result of the weak polarization birefringence, a longer length of the device may be required for MMI-based polarization manipulators. For example, the MMI-based polarization splitter may need to be several millimeters long to separate a transverse electric (TE) mode and a transverse magnetic (TM) mode of the optical signal.

Unfortunately, methods such as quasi-state MMI coupler, slot waveguide, and staircase MMI coupler cannot reduce the total device length without compromising the device performance, or inducing extra fabrication difficulties. For example, the quasi-state MMI coupler causes an intrinsic ~2 dB excess insertion loss. Similarly, the slot waveguide and the staircase MMI coupler are difficult to fabricate.

Accordingly, various embodiments are based on another realization that a single MMI device can include a shifting section for shifting phases of the spatial modes of the optical signal, such that the input optical signal is manipulated. Moreover, such a shifting section can transform a single MMI device into a polarization manipulator, which provides a number of benefits.

First, it is advantageous to use a single MMI device as a polarization manipulator, because the single MMI device is relatively simple to fabricate. As used herein, the MMI device is such a device that is suitable for propagating an optical signal having multiple spatial modes at any point of the device, as contrasted with a combination of multiple MMI devices.

Second, the phase shifting in the MMI device according to some embodiments causes a strong polarization birefringence, resulting in separation of the TE and TM modes in short propagation distance, and thus, reduces the length of the MMI manipulators.

For example, one embodiment includes a polarization splitter on an InP substrate using multi-mode interference (MMI). The shifting section includes a metal overlayer in combination with a tilted joint, which causes a strong polarization birefringence resulting in separation of the TE and TM modes over a short propagation distance.

For example, in one variation of this embodiment, the shifting section only about half the length of the single self-image distance, and the total MMI device length is about 800 μm. The MMI device of this embodiment has a polarization extinction ratio over 23.7 dB and an insertion loss below 0.59 dB over the wavelength range from 1570 to 1620 nm for both the TE and TM polarization. The fabrication tolerance is also advantageous. For example, insertion loss remains below 0.57 dB and polarization extinction ratio remains over 12.5 dB with respect to a silicon nitride ($SiN_x$, layer thickness variation of ~10%.

Accordingly, one embodiment of an invention discloses a multi-mode interference includes a core portion suitable, at any point, for propagating an optical signal having multiple spatial modes. The core portion includes a shifting section for shifting phases of the spatial modes of the optical signal.

Another embodiment discloses a method for manipulating an optical signal having a first component in a transverse electric (TE) mode and a second component in a transverse magnetic (TM) mode. The method propagates the optical signal in a multi-mode interference (MMI) device suitable for propagating the optical signal at any point of a core portion of the device; and shifts phases of the first and the second components of the optical signal such that the optical signal is manipulated.

BRIEF DESCRIPTION OF THE DRAWINGS

FIG. 1 is a functional diagram of multi-mode interference (MMI) device according to some embodiments of the invention;

FIGS. 2A-B are top and cross-sectional view schematics of the MMI device according to one embodiment;

DETAILED DESCRIPTION OF THE PREFERRED EMBODIMENT

Figures 3A, 3B:
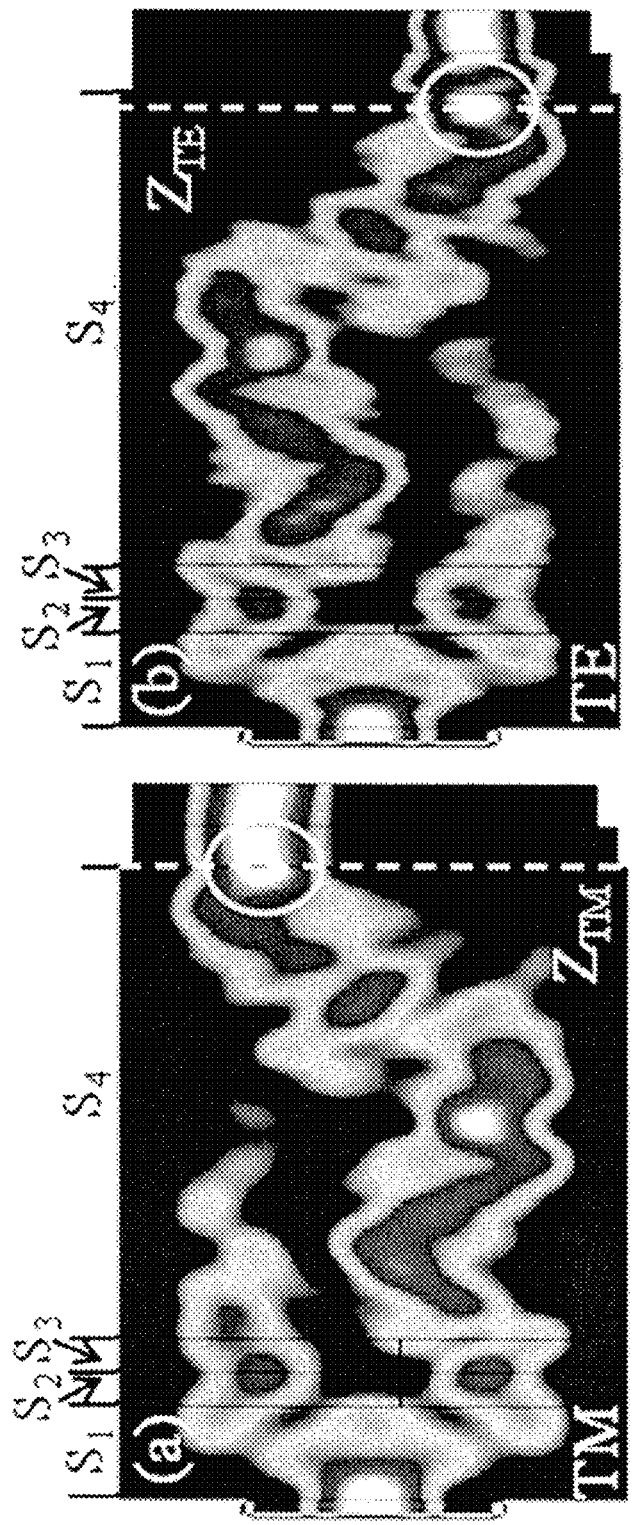
FIGS. 3A-B are interference patterns in the MMI device of FIGS. 2A-B.

Various embodiments of the invention are based on the realization that multimode interference (MMI) device can be advantageously used as a polarization manipulator due to the compactness, large bandwidth, and high fabrication tolerance.

For example, it is realized that MMI-based polarization devices constructed on III-V substrates, such as InP and GaAs provide capabilities of integrating active PIC components, such as laser and semiconductor optical amplifier (SOA) with other passive components.

However, it is difficult to design the MMI-based polarization manipulator on III-V material systems for several reasons. First, MMI is inherently a polarization-insensitive device, which does not provide strong polarization birefringence between transverse electric (TE) and transverse magnetic (TM) modes required by polarization splitter. Second, strong polarization birefringence is difficult to achieve in material systems due to small index contrast between core and cladding layer relative to Silicon on Insulator (SOT) systems.

Accordingly, various embodiments are directed to a single MMI device that includes a shifting section for shifting phases of the spatial modes of the optical signal such that the input optical signal is manipulated. Such shifting section can transform a single MMI device into a polarization manipulator.

As used herein, the MI device is such a device that is suitable for propagating an optical signal having multiple spatial modes at any point in the device. As described in more details below, the phase shifting in the MMI device causes a strong polarization birefringence, resulting in good separation of the TE and TM modes over a relatively short propagation distance.

FIG. 1 shows a functional diagram of the MMI device 100 according to some embodiments of the invention. The MMI device 100 includes an input section 110, a shifting section 120, and an output section 130. An optical signal including the TM mode component 112, and the TE mode component 114 is coupled into the input section 110 and split using the shifting section 120 into two arms 132 and 134 of the output section 130 with, e.g., equal phase and equal power. In some variations, the input section includes 1×2 MMI coupler, i.e., an input signal is split into 2 outputs, and the output section includes 2×2 MMI coupler, i.e., a coupler with two input signals and two 2 output signals and each input signal is split into two outputs.

The phase shift section is designed, for example, to add an extra $-\pi/2$ phase shift 122 to the TM mode component in the upper arm and an extra $-\pi/2$ phase shift 124 to the TE mode component in the lower arm. When the electric fields from both arms are combined in the output section, the electric field in one output coming from the cross arm 142 (e.g., the field in upper output from the lower arm, or the field in the lower output from upper arm) has an extra $-\pi/2$ phase shift compared with that from the bar arm 144 (e.g., field upper output from upper arm or field lower output from lower arm).

The interference between electric fields with different phases cause the TM polarization mode into the upper output arm 132, whereas the TE polarization mode is forced into the lower output arm 134. Accordingly, the optical signal having the TE and TM modes is split into a first signal 152 having TM mode and a second signal 154 having TE mode.

The phase shifting section can be implemented using various techniques. For example, in one embodiment the shifting section shifts phases of the first and the second components of the optical signal based on surface plasmons. In this embodiment, TM mode component is strongly pulled towards a metal interface, and the components in TE and TM modes encounter phase shift of different sign. In another embodiment, the shifting section shifts phases of the first and the second components of the optical signal based on anisotropic stress inside quantum wells of the MMI device. In yet another embodiment the shifting section shifts phases of the first and the second components of the optical signal based on stress-induced birefringence produced in the MMI device. The birefringence arising from the material results in different phase shift between TE and TM modes.

FIGS. 2A-B are schematics of the MMI device according to one embodiment. FIG. 2A shows a top view of the MMI device. FIG. 2B shows a cross-section along an edge 234. In this embodiment, the shifting section includes a tilted section partially covered by an overlay. For example, the shifting section includes a first shifting section 210 arranged in parallel with the input section 110 and a second shifting section 220 arranged in parallel with the output section 130. In this embodiment, the first and the second shifting sections are tilted 225 with respect to each other and a portion of the shifting section is covered with an overlay 215. Typically, the overlay 215 includes a metal, such as gold. The tilt 225 in combination with the overlay 215 creates the surface plasmon effect leading to the functionality described above.

In various embodiments, the parallel and tilted arrangements of the sections of the MMI device are achieved by orienting lateral and end edges of the sections. For example, each section of the MMI device includes two lateral edges, e.g., edges 232 and 234 and two end edges, e.g., edges 236 and 238.

The sections are typically connected by corresponding lateral edges, and end edges of the sections can form edges of the MMI device. Accordingly, the sections are arranged such that the end edges of the first shifting section form straight angles with end edges of the input section, the end edges of the second shifting section form straight angles with the end edges of the output section. In contrast, the end edges of the first shifting section form acute or obtuse angles with the end edges of the second shifting section, i.e., these sections are tilted.

In various embodiments the shifting section is integrated into the 1×2 MMI and 2×2 MMI coupler, which reduces the length of the MMI device. The overlayer in a lower part of the shifting section reflect the electric field for the TE mode, which reduces the propagation constant for the component in TE mode, and to attract the electric field for the TM mode, which increases the propagation constant for the component in the TM mode.

This opposite effects add an extra $-\Theta-\pi/2$ phase shift to the TM mode in the upper part or an extra $-\Theta-\pi/2$ phase shift to the TE mode in the lower part of the shifting section. The constant phase, $\Theta$, can be set to 0 by adjusting the tilted angle. Typically, the adjusting is made in the design stage of fabricating MMI device. Additionally or alternatively, adjusting of the tilted angle can be made by locally changing the refractive index by applying electric field or heating.

One variation of this embodiment has the following geometrical parameters. These parameters are provided for example purposes. An input waveguide 240 has a width 245 of $W_{input}$=5 μm. The multimode MMI device includes four sections, $S_1$, $S_2$, $S_3$, and $S_4$. The $S_1$ and $S_4$ sections, i.e., the input and the output sections, do not include the gold overlay, whereas the lower parts of the $S_2$ and $S_3$ sections, i.e., the first and the second parts of the shifting section, are covered by deposited gold. The $S_2$ and $S_3$ sections are joined by angled tilt 225 of 0.38 degree. The MMI device has a width 250 of $W_{MMI}$=12 μm and a total length of L=754 μm. The gold overlay has a width 255 of $W_m$=5.3 μm and a length of $L_m$=81 μm in total. The lengths of the $S_1$, $S_2$, $S_3$, and $S_4$ section are $\frac{1}{5}L-\frac{1}{2}L_m$, $\frac{1}{2}L_m$, $\frac{1}{2}L_m$ and $\frac{4}{5}L-\frac{1}{2}L_m$, respectively. The upper output arm 260 has a width of $W_{TM}$=5 μm and is placed 3 μm from the center of the MMI device.

The first section of the lower output arm 262 has a width of $W_{con}$=5.5 μm and a length 264 of $L_{con}$=50 μm; the gap size 263 between the first section of lower output and the upper output is $G_1$=0.84 μm; the second section of the lower output has a width of $W_{TE}$=4.47 μm; the gap size 267 between the second section of lower output and the upper output is $G_2$=1.27 μm. The device is built on Indium Phosphide (InP) substrate 270 with a 0.5 μm thick 273 spell out InGaAsP Q1.3 layer 275 as waveguide core and 0.1 μm thick 279 Silicon Nitride ($SiN_x$) layer 277 as buffer layer. The thickness 280 of the gold overlay 215 is 0.2 μm. Also, even though FIG. 2B shows that the core portion 275 of the waveguide is etched to the InP substrate 270, other embodiments use the core portion partially etched or not etched at all.

FIGS. 3A-B show the interference patterns in the MMI-based polarization splitter of FIGS. 2A-B. For better illustration, the tilted MMI coupler is mapped into a straight waveguide. The single self images for the TM and TE modes build constructively near the upper and lower outputs, respectively. However, the self-image plane for TM polarization, $Z_{TM}$, does not coincide with the self-image plane for the TE polarization, $Z_{TE}$. When the upper and lower outputs are placed at the TM self-image plane, the accurate TE self image cannot be obtained at the lower output, which reduces the transmission.

To solve this problem, one embodiment uses a two-section TE output waveguide, such as an output arm 134 having sections 262 and 266, as shown in FIG. 2A. As shown in FIG. 3B, the first section of the lower output waveguide functions as a mode converter, refocusing the divergent TM electric field of the $TE_0$ mode back into a self image. Such two-section TE output arm optimizes the transmission of the component in the TE mode.

The total length of the MMI device of this embodiment is less than 800 μm. In addition, the two-section TE output waveguide optimizes the power transmission. The MMI device of this embodiment has a polarization extinction ratio over 23.7 dB and an insertion loss below 0.59 dB over the wavelength range from 1570 to 1620 nm for both TE and TM polarization. The fabrication tolerance is also high. For a thickness variation of ~10%, the insertion loss remains below 0.57 dB and the polarization extinction ratio remains over 12.5 dB.

Figure 4A:
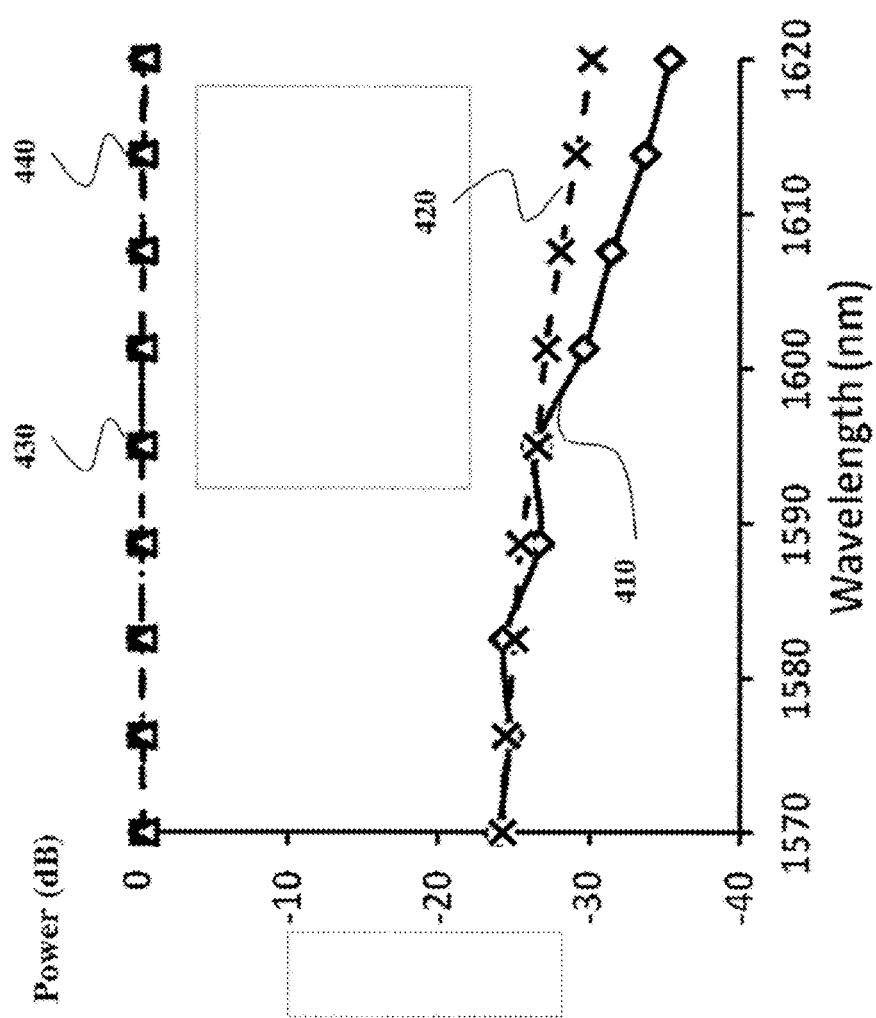
FIG. 4A is a graph of normalized output power as a function of wavelength.
Figure 4B:
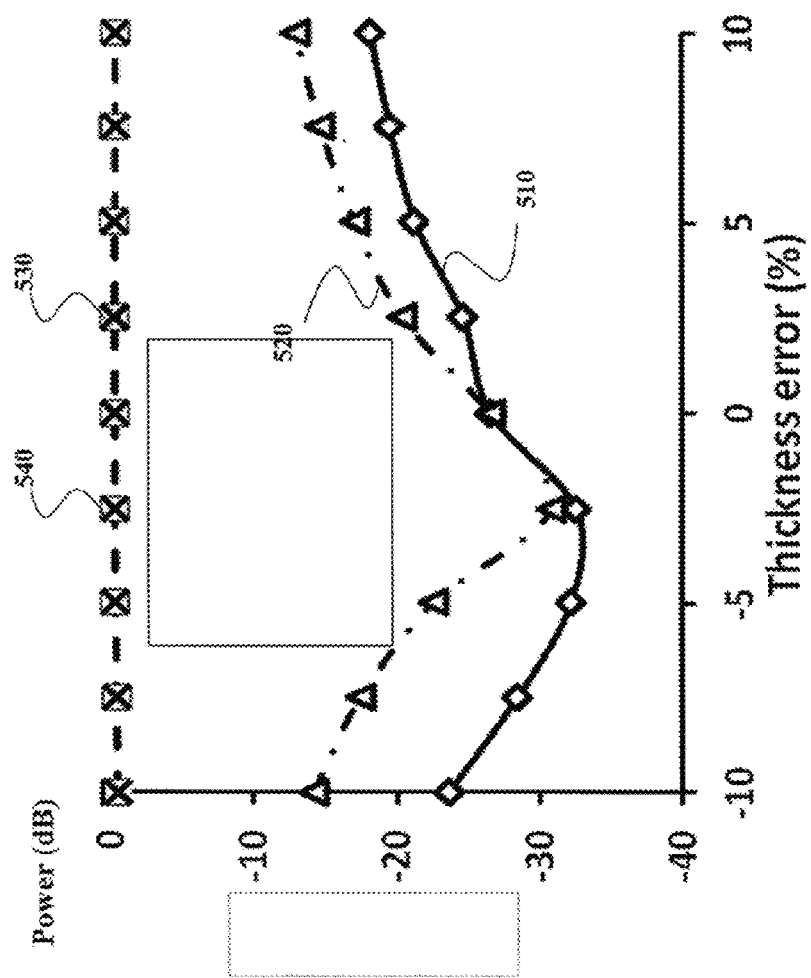
FIG. 4B is a graph of normalized output power as a function of thickness error of a buffer layer.

FIG. 4 shows the normalized $TE_0$ mode output power from the upper 410 and lower 430 outputs excited by $TE_0$ mode input as well as the normalized $TM_0$ mode output power from the upper 440 and lower 420 outputs excited by $TM_0$ mode input as functions of wavelength from 1570 to 1620 nm, which approximately covers the L band (1565-1612 nm). For both TE and TM polarization, the polarization splitter of this specific embodiment has an insertion loss smaller than 0.59 dB, and PER larger than 23.7 dB over a wavelength range of 50 nm. During MMI device fabrication, the sensitive parameter is the $SiN_x$ buffer layer thickness.

FIG. 5 shows the normalized $TE_0$ mode output power from the upper 510 and lower 530 output excited by $TE_0$ mode input as well as the normalized $TM_0$ mode output power from the upper 520 and lower 540 output excited by $TM_0$ mode input at the wavelength of 1595 nm as functions of thickness error of $SiN_x$ buffer layer. For both TE and TM polarization, the polarization splitter of this implementation exhibits an insertion loss smaller than 0.57 dB and PER larger than 12.5 dB with the thickness variation of ~10%.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A multi-mode interference (MMI) device, comprising:
a core portion suitable, at any point, for propagating an optical signal having multiple spatial modes, wherein the core portion includes a shifting section for shifting phases of the spatial modes of the optical signal, wherein the optical signal includes a first component in a transverse electric (TE) mode and a second component in a transverse magnetic (TM) mode, and wherein the optical signal is split into a first signal of the TE mode and a second signal of the TM mode;
an input section for accepting the optical signal; and
an output section for outputting the first optical signal and the second optical signal, wherein the shifting section includes a first shifting section arranged in parallel with the input section and a second shifting section arranged in parallel with the output section, wherein the second shifting section is tilted with respect to the first shifting section, and wherein a portion of the shifting section is covered with a metal overlay.

2. A multi-mode interference (MMI) device, comprising:
a core portion suitable, at any point, for propagating an optical signal having multiple spatial modes, wherein the core portion includes a shifting section for shifting phases of the spatial modes of the optical signal, wherein the optical signal includes a first component in a transverse electric (TE) mode and a second component in a transverse magnetic (TM) mode, and wherein the optical signal is split into a first signal of the TE mode and a second signal of the TM mode;
an input section for accepting the optical signal; and
an output section for outputting the first optical signal and the second optical signal, wherein the output section includes a first output arm for outputting the first component in the TM mode, and a second output arm for outputting the second component in the TE mode, wherein the second output arm includes a mode converter.

3. A multi-mode interference (MMI) device, comprising:
a core portion suitable, at any point, for propagating an optical signal having multiple spatial modes, wherein the core portion includes a shifting section for shifting phases of the spatial modes of the optical signal, wherein the optical signal includes a first component in a transverse electric (TE) mode and a second component in a transverse magnetic (TM) mode, and wherein the optical signal is split into a first signal of the TE mode and a second signal of the TM mode, and wherein a first part of the shifting section adds an extra $-\pi/2$ phase shift to the first component in the TM mode, and a second part of the shifting section adds an extra $-\pi/2$ phase shift to the second component in the TE mode.

4. The device of claim 3, wherein the shifting section shifts phases of the first and the second components of the optical signal based on surface plasmons.

5. The device of claim 4, wherein the phases are shifted by locally heating the device.

6. The device of claim 5, wherein each section of the MMI device includes two lateral edges and two end edges, wherein the sections are connected by corresponding lateral edges, wherein end edges of the sections form edges of the MMI device, wherein end edges of the first shifting section form straight angles with end edges of the input section, wherein end edges of the second shifting section form straight angles with end edges of the output section, wherein the end edges of the first shifting section form acute or obtuse angles with the end edges of the second shifting section.

7. The device of claim 4, wherein the phases are shifted by locally applying an electric field to the device.

8. The device of claim 3, wherein the shifting section shifts phases of the first and the second components of the optical signal based on stress-induced birefringence produced in the MMI device.

9. The device of claim 3, wherein the shifting section includes a tilted section partially covered by an overlay.

10. The device of claim 6, wherein the overlay includes gold or silver.

11. The device of claim 3, wherein the shifting section shifts phases of the first and the second components of the optical signal based on anisotropic stress inside quantum wells of the device.

12. The device of claim 2, further comprising:
an input section for accepting the optical signal; and
an output section for outputting the first optical signal and the second optical signal.

13. The device of claim 12, wherein the shifting section includes a first shifting section arranged in parallel with the input section and a second shifting section arranged in parallel with the output section, wherein the second shifting section is tilted with respect to the first shifting section, and wherein a portion of the shifting section is covered with a metal overlay.

14. The device of claim 12, wherein the input section includes a 1×2 MMI coupler and the output section includes a 2×2 MMI coupler.

15. The device of claim 12, wherein the output section includes a first output arm for outputting the first component in the TM mode, and a second output arm for outputting the second component in the TE mode.

16. The device of claim 15, wherein the second output arm includes a mode converter.

17. A method for manipulating an optical signal having a first component in a transverse electric (TE) mode and a second component in a transverse magnetic (TM) mode, comprising:
propagating the optical signal in a multi-mode interference (MMI) device suitable for propagating the optical signal at any point of a core portion of the device; and
shifting phases of the first and the second components of the optical signal such that the optical signal is manipulated, wherein the shifting is based on surface plasmons.

18. The method of claim 17, wherein the manipulating includes splitting the optical signal into a first signal of the TE mode and a second signal of the TM mode.

19. The method of claim 18, further comprising:
outputting the first signal in a first output arm; and
outputting the second signal in a second output arm.

* * * * *